(12) United States Patent
Gemme et al.

(10) Patent No.: US 6,911,610 B2
(45) Date of Patent: Jun. 28, 2005

(54) MEDIUM VOLTAGE SWITCHING DEVICE

(75) Inventors: Carlo Gemme, Genova Quinto (IT); Andrea Moratto, Milan (IT); Roberto Borlotti, Bagnatica (IT); Osvaldo Prestini, Nembro (IT)

(73) Assignee: ABB Technology AG, Zurich (CH)

( * ) Notice: Subject to any disclaimer, the term of this patent is extended or adjusted under 35 U.S.C. 154(b) by 114 days.

(21) Appl. No.: 10/451,533

(22) PCT Filed: Dec. 18, 2001

(86) PCT No.: PCT/EP01/15111

§ 371 (c)(1),
(2), (4) Date: Jun. 24, 2003

(87) PCT Pub. No.: WO02/054555

PCT Pub. Date: Jul. 11, 2002

(65) Prior Publication Data

US 2004/0094397 A1 May 20, 2004

(30) Foreign Application Priority Data

Dec. 28, 2000 (EP) .......................... 00204754

(51) Int. Cl.⁷ .............................. H01H 3/18
(52) U.S. Cl. .................. 200/48 R; 200/52 R; 335/179; 335/229; 335/234; 400/248
(58) Field of Search .............................. 200/48 R, 52 R; 400/248, 322, 323; 218/120, 118; 335/179–182, 229–234

(56) References Cited

U.S. PATENT DOCUMENTS

| | | | | |
|---|---|---|---|---|
| 3,958,095 A | * | 5/1976 | Zaffrann et al. | 200/293 |
| 4,101,746 A | * | 7/1978 | Grieger et al. | 200/82 B |
| 4,662,233 A | * | 5/1987 | Mazzorana | 74/7 A |
| 5,072,082 A | * | 12/1991 | Kowalik | 218/23 |
| 5,170,144 A | * | 12/1992 | Nielsen | 335/229 |
| 5,525,769 A | * | 6/1996 | Anderson | 200/1 R |
| 5,917,692 A | * | 6/1999 | Schmitz et al. | 361/187 |
| 6,156,989 A | * | 12/2000 | Miller et al. | 218/120 |
| 6,262,648 B1 | * | 7/2001 | Lammers | 335/229 |
| 6,362,445 B1 | * | 3/2002 | Marchand et al. | 218/155 |

FOREIGN PATENT DOCUMENTS

| | | |
|---|---|---|
| DE | 19845779 A1 | 3/2000 |
| EP | 0944149 A2 | 9/1999 |
| EP | 0944149 A3 | 3/2000 |

* cited by examiner

*Primary Examiner*—K. Lee
(74) *Attorney, Agent, or Firm*—Connolly Bove Lodge & Hutz LLP; Larry J. Hume

(57) ABSTRACT

A medium voltage switching device includes an electromagnetic actuation chain and a power supply which provides electric power to the electromagnetic actuation chain. The power supply includes at least a first power supply device which is electrically connected to a medium voltage power distribution line, so as to drain electric power directly from the distribution line, and a second circuit configured to store at least the electric energy drained from the medium voltage power distribution line, and to thereby provide the electromagnetic actuation chain with electric power.

20 Claims, 2 Drawing Sheets

MEDIUM VOLTAGE SWITCHING DEVICE

BACKGROUND

The present invention relates to an improved medium voltage (MV) switching device. More particularly, the present invention relates to an improved MV switching device, such as a circuit breaker, a disconnector, a recloser or the like, which is particularly useful for the use in medium-voltage power distribution networks, i.e. approximately for voltage values between 1 KV and 50 KV.

As it is known, a MV switching device normally comprises a control unit and an actuation chain for actuating, i.e. coupling/uncoupling, the electric contacts of the MV switching device. The control unit receives opening/closing commands, for example from a protection device or an operator. Based on these commands, it sends control signals to the actuation chain that provides for operating the electric contacts of the switchgear, so as to bring it in the desired operating state, i.e. an opening state or a closing state.

Initially, MV switching devices of the state of the art were generally of the mechanical type, i.e. provided with an actuation chain which basically adopts suitable mechanical arrangements including for example springs or leverages.

Recently, electromagnetic switching devices, i.e. devices provided with an electromagnetic actuation chain have been introduced. An electromagnetic actuation chain generally comprises an electromagnetic actuator operatively connected to the electric contacts of the switchgear by means of a kinematic chain. The electromagnetic actuation chain is generally supplied by power supply means, which normally draw electric power from a separated power distribution line with voltage values lower than 1 KV, i.e. a power distribution line of the low voltage (LV) kind. Power supply means comprise generally a plurality of capacitor banks, connected to a power charger, which provides electric power to the capacitor banks from a LV voltage source, in order to maintain a suitable level of stored electric energy.

Once the control unit receives an opening/closing signal, it commands a power circuit to provide electric power to the electromagnetic actuator. Meanwhile, the power charger provides electric power to the capacitor banks in order to restore a suitable level of stored electric energy.

MV switching devices of the electromagnetic type have represented a remarkable improvement in the state of the art, particularly in terms of costs and performances. Nevertheless, they still have some drawbacks.

These drawbacks are represented by the fact that some important requirements, which are commonly felt as important by the user, are not fully satisfied. A first important requirement consists of the possibility of supplying electric power to the electromagnetic actuation chain, in a substantially continuous manner.

For example, the MV switching device should be able to maintain, if needed, the MV switching device in a certain operating state, particularly in a closing state, for an indefinite period of time and should be able to change its operating state at any time. A second important requirement consists of the possibility of having a substantially self-supplied MV switching device. In practice, the operation efficiency of a MV switching device should not depend on an external power supply.

Unfortunately, in case of fault of the power supply means, an electromagnetic MV switching device is able to perform opening/closing operations, only for a short period of time, due to the fact that the power supply means basically depend on external power source, i.e. a LV power distribution line. Thus, only a single OCO (opening/closing/opening) switching cycle can be performed normally. In fact, in case of power supply failure, the MV switching device is able to operate until there is a certain amount of energy stored in the capacitor banks. After capacitor banks are discharged, no further operation is possible till the power supply is not restored. Thus, for example, it is difficult to perform an O-0.3 s-CO-15 s-CO (opening/0.3 s delay-closing/opening-15 s delay-closing/opening) switching cycle, which is commonly required by the user. This can be achieved, for example, over-sizing the capacitor banks but this is quite expensive.

This fact leads a reduced safety and reliability of the electromagnetic MV switching devices, especially if compared with MV switching devices, which adopt a purely mechanical actuation chain. Thus, the practice has shown that, often, the electromagnetic MV switching device has to be associated to continuity power supply systems that are relatively expensive and, therefore, make the electromagnetic MV switching devices less competitive and limited to high end applications.

Therefore, the main aim of the present invention is to provide an electromagnetic medium voltage switching device, i.e. 0adopting an electromagnetic actuation chain, which allows overcoming the drawbacks described above.

SUMMARY

Within this aim, another object of the present invention is to provide an electromagnetic medium voltage switching device which is self-supplied during the execution of opening/closing operations.

Another object of the present invention is to provide an electromagnetic medium voltage switching device which is able to provide a power supply to the electromagnetic actuation chain in a substantially continuous manner.

Another object of the present invention is to provide an electromagnetic medium voltage switching device which is able to maintain a certain operating state, particularly a closing state, for an indefinite period of time and is able to change its operating state at any time.

Another object of the present invention is to provide an electromagnetic medium voltage switching device which is substantially always able to perform the most required switching operations or cycles.

Not the least object of the present invention is to provide an electromagnetic medium voltage switching device which can be easily realized at competitive costs.

Thus, the present invention provides a medium voltage switching device that comprises at least a movable contact and a fixed contact which are electrically connected to a phase conductor of a medium voltage power distribution line. The movable contact and the fixed contact are coupled/uncoupled respectively during a closing/opening operation of said MV switching device. Further, the medium voltage switching device according to the present invention, comprises an electromagnetic actuation chain for actuating said movable contact. The electromagnetic actuation chain comprises at least an electromagnetic actuator and a kinematic chain, for operatively connecting said electromagnetic actuator to said movable contact. The medium voltage switching device comprises also power supply means for providing electric power to said electromagnetic actuation chain.

The medium voltage switching device according to the present invention is characterized in that said power supply means comprise at least a first power is supply device which is electrically connected to said medium voltage power distribution line. The first power supply device comprises first circuit means for draining electric power directly from said medium voltage power distribution line and second circuit means for storing the electric energy, which is drained from said medium voltage power distribution line, and for providing said electromagnetic actuation chain with a power supply.

BRIEF DESCRIPTION OF THE DRAWINGS

Further characteristics and advantages of the medium voltage switching device, according to the present invention, will become more apparent from the detailed description of preferred embodiments illustrated only by way of non-limitative example in the accompanying drawings, wherein.

DETAILED DESCRIPTION

Figure 1:
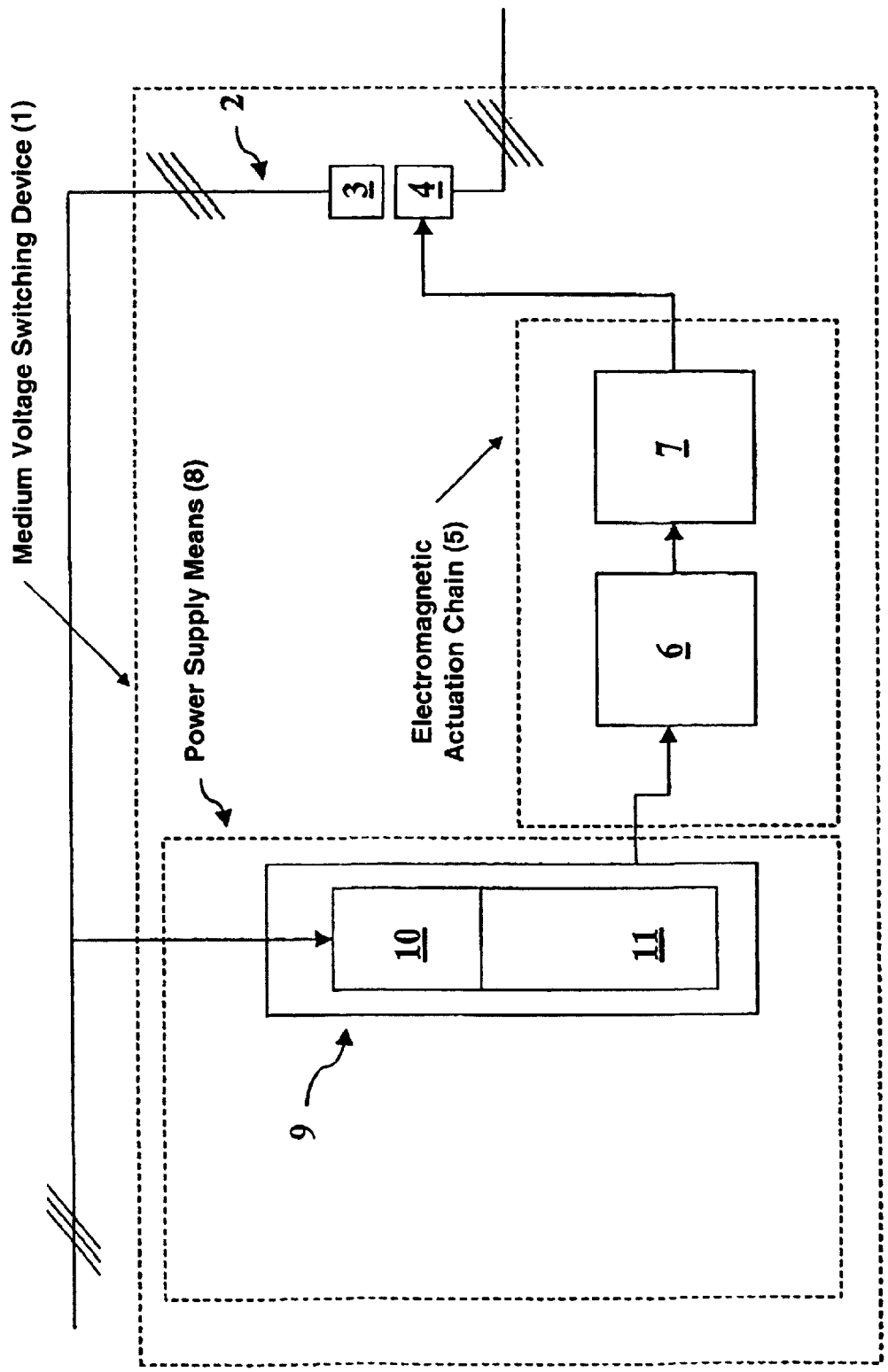
FIG. 1 is a block diagram which schematically illustrates a preferred embodiment of the medium voltage switching device according to the present invention.

Referring to FIG. 1, the medium voltage switching device according to the present invention, indicated by the reference 1, comprises at least a movable contact 4 and a fixed contact 3, which are electrically connected to a phase conductor of a MV power distribution line 2. The movable contact 4 and the fixed contact 3 are suitable to be coupled/uncoupled respectively during a closing/opening operation of the MV switching device 1.

The MV switching device 1 comprises also an electromagnetic actuation chain 5 for actuating the movable contact 4. The electromagnetic actuation chain 5 comprises preferably an electromagnetic actuator 6 and a kinematic chain 7, for operatively connecting the electromagnetic actuator 6 to the movable contact 4. Further, the MV switching device 1 comprises power supply means 8 for providing electric power to the electromagnetic actuation chain 5.

Preferably, the MV switching device 1 comprises also a control unit, which is able to regulate the behavior of the electromagnetic actuation chain 5 and/or of the power supply means 8.

The power supply means 5 comprise at least a first power supply device 9, which is electrically connected to the MV power distribution line 2.

The first power supply device 9 comprises first circuit means 10 for draining electric power directly from the MV power distribution line 2 and second circuit means 11 for storing the electric energy, which is drained from the MV power distribution line 2. The second circuit means 11 are also aimed at providing the electromagnetic actuation chain 5 with a power supply.

Figure 2:
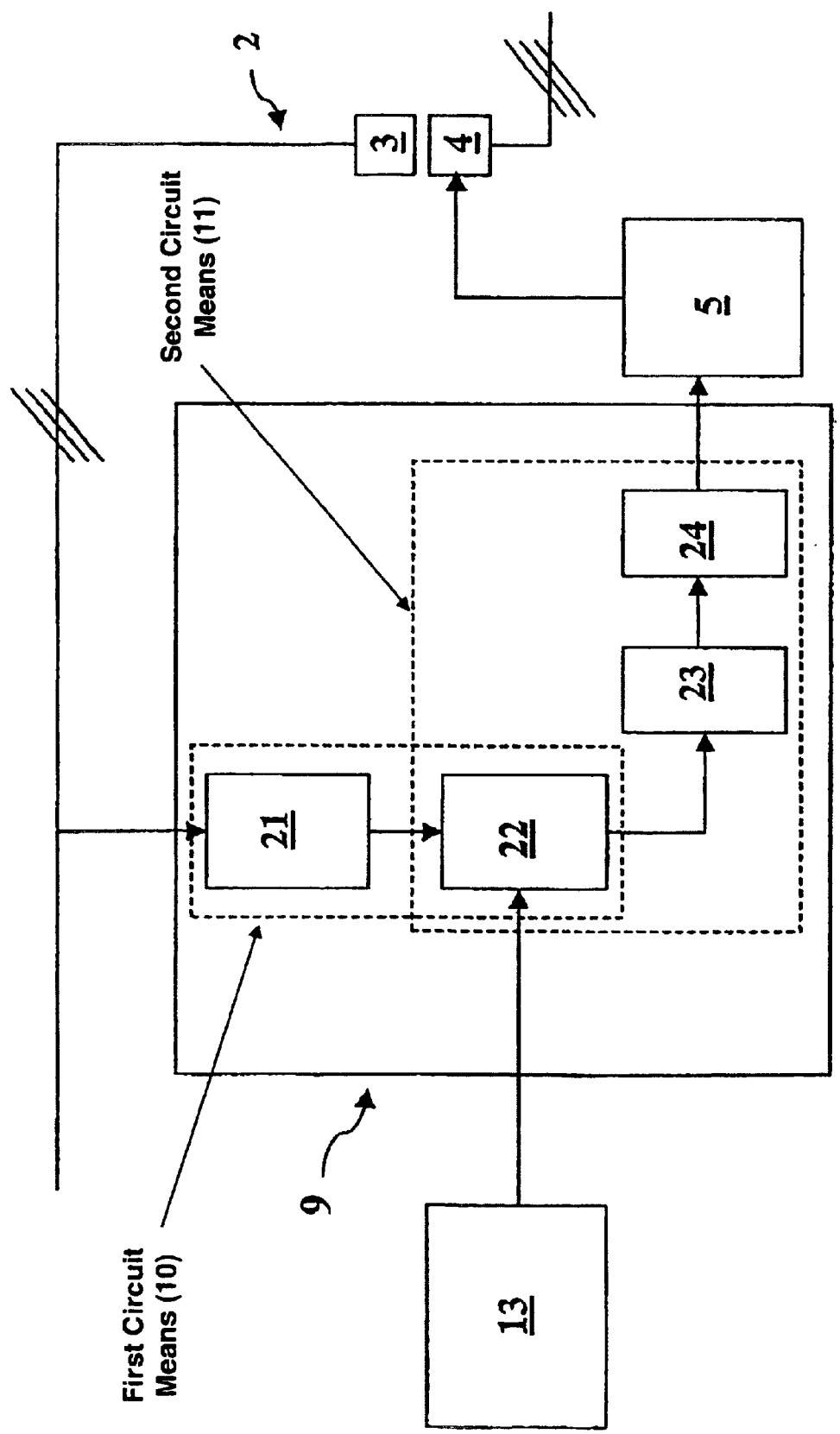
FIG. 2 is a block diagram which schematically illustrates some details of a preferred embodiment of the medium voltage switching device according to the present invention.

Referring now to FIG. 2, preferably, the first circuit means 10 comprise a power drain unit 21, which is connected to the MV power distribution line 2. The power drain unit is connected also to a first power electronic unit 22. Preferably, the power drain unit 21 may comprise a power capacitor circuit, which is able to drain electric power towards suitable power circuits that are advantageously included in the first power electronics unit 22.

The second circuit means 11 comprise preferably the first power electronics unit 22 and an energy storage unit 23, which is electrically connected to the first power electronics unit 22. The energy storage unit 23 is able to store a certain amount of electric energy. As it will be better described in the following the energy storage unit 23 may comprise at least a battery storage device and/or a capacitor storage device (not shown). Preferably, the second circuit means 11 comprise also a second power electronics unit 24, which is electrically connected downstream the energy storage unit 23. The second power electronics unit 24 comprises suitable power circuits, for regulating the power supply from the energy storage unit 23 to the electromagnetic actuation chain 5 (and particularly to the electromagnetic actuator 6).

The MV switching device 1, according to the present invention, is able to fully satisfy the most important requirements which are commonly needed in order to guarantee reliable and safe switching operations.

Particularly, the first power supply device 9 is able to provide the electromagnetic actuation chain 5 with a power supply which compensates the energy consumption, required for maintaining the electromagnetic actuator 6 in a predefined operating state, particularly a closing operating state. In this case the first circuit means 10 have to drain from the MV power distribution line an amount of electric power $P_{drain}$, which may be indicated as:

$$P_{drain}=P_{pe}+P_{selfdischarge}+P_{state} \text{ where:}$$

$P_{pe}$ is the power absorbed by the first and second power electronics units 22 and 24; and $P_{selfdischarge}$ is the power dissipated by the energy storage unit 23 due to self discharge phenomena; and $P_{state}$ is the power adsorbed by the electromagnetic actuation chain 5, for maintaining the electromagnetic actuator 6 in a predefined state for an indefinite period of time.

It should be noticed that, due to the fact that the first circuit means 10 derive the electric power from the MV power distribution line, power for maintaining the electromagnetic actuator in a desired operating state can be supplied for an indefinite period of time. Also if the MV power is lost the electromagnetic actuator can be supplied for a certain period of time and can be brought into a desired state.

In this case, the second circuit means 11 have mainly the function of simply transferring the drained electric power to the electromagnetic actuation chain. Further, the first power supply device 9 is able to provide the electromagnetic actuation 5 with a power supply, which can compensate the energy consumption required for executing an operation of the electromagnetic actuator 5 with a predefined frequency operation.

In this case, the first circuit means 10 have to drain from the MV power distribution line an amount of electric power $P_{drain}$, which may be indicated as:

$$P_{drain}=P_{pe}+P_{selfdischarge}+E_{op}*F_{op} \text{ where:}$$

$P_{pe}$ and $P_{selfdischarge}$ have the same meaning as above, and $E_{op}$ is the energy required for executing a certain operation (for example an OCO switching sequence) and $F_{op}$ is the required frequency for this operation.

Accordingly, the first power supply device 9 is able to provide the electromagnetic actuation 5 with a power supply, which compensates the energy consumption required for executing an operation of the electromagnetic actuator 5 with a time delay which is shorter than a predefined period of time.

This is quite advantageous, for example, during the starting up of the system or after a prolonged loss of the MV power line, when the energy storage unit 23 is totally discharged.

In this case, the first circuit means 10 have to drain from the MV power distribution line an amount of electric power $P_{drain}$, which may be indicated as:

$$P_{drain}=P_{pe}+P_{selfdischarge}+E_{op}/T_{delay} \text{ where:}$$

$P_{pe}$ and $P_{selfdischarge}$ have the same meaning as above, and $E_{op}$ is the energy required for executing a certain operation, for example an OCO switching sequence, and $T_{delay}$ is the maximum delay, which is allowed.

In both the last described cases, the second circuit means 11 have the main function of storing a suitable amount electric energy which is made available when switching cycles and operations are required.

As mentioned above the energy storage unit 23 may comprise at least a battery storage device (not shown). The battery storage device may be suitably sized so as to be able to supply the energy required for a relatively high number of consecutive operations of the MV switching device 1, for example 10–100 operations.

Advantageously, the energy storage unit 23 may comprise also at least a capacitor storage device, which is particularly useful since it allows providing the actuation chain 5 with relatively high currents. In practice, the capacitor storage device allows lowering the surge current requirements for the mentioned battery storage device, since it is better suited to deliver high surge currents when needed. This fact allows achieving optimal performances of the MV switching device 1 at relatively low costs, since the weight and volume of the battery storage device are not substantially increased.

It should be also noticed that, thanks to the modular structure of the first power supply device 9, the MV switching device 1 is characterized by a high flexibility of use. For example, in a preferred embodiment (FIG. 2), the power supply means 8 may comprise a second power supply device 13, which is electrically connected to a LV power distribution line (not shown), when this is available. Preferably, the second power supply device may be electrically connected directly to the second circuit means 11, and particularly to the first power electronics unit 22.

Advantageously, the second power supply device 13 can be used as the main power supply in normal conditions, while the first power supply unit may be used only in case of fault of the LV power distribution line.

This flexibility of use is particularly useful when it is necessary to install the MV switching device 1 according to the present invention, with the aim of replacing already existing MV switching devices.

The MV switching device according to the present invention, allows achieving the intended aims and objects. Particularly, it allows satisfying all the main requirements in terms of reliability and safety, since it is self-supplied and it can provide a substantially continuous power supply to the electromagnetic actuation chain. Thus, the practice has shown that, the MV switching device, according to the present invention, is able to conjugate the improved switching performances of a typical electromagnetic switching device with the intrinsic safety and reliability of a typical mechanical switching device.

Therefore, it is no more necessary to equip the electromagnetic MV switching device with expensive continuity power supply systems in order to guarantee a suitable level of safety and reliability of the switching operations. Thus, the MV switching device, according to the present invention, can be used in those applications where continuity power systems are not present.

Finally, the MV switching device according to the present invention has proven to require in practice relatively low cost efforts for its realization.

What is claimed is:

1. A medium voltage switching device comprising:
   at least a movable contact and a fixed contact which are electrically connected to a phase conductor of a medium voltage power distribution line and are suitable for being coupled/uncoupled respectively during a closing/opening operation of said medium voltage switching device; and
   an electromagnetic actuation chain for actuating said movable contact, said electromagnetic actuation chain comprising an electromagnetic actuator and a kinematic chain, for operatively connecting said electromagnetic actuator to said movable contact; and power supply means for providing electric power to said electromagnetic actuation chain;
   wherein said power supply means comprise at least a first power supply device which is electrically connected to said medium voltage power distribution line, said first power supply device comprising first circuit means for draining electric power directly from said medium voltage power distribution line and second circuit means for storing at least the electric energy drained from said medium voltage power distribution line, and for providing said electromagnetic actuation chain with a power supply.

2. A medium voltage switching device according to claim 1, wherein said first power supply device provides said electromagnetic actuation chain with the electric power, which is required for maintaining said electromagnetic actuator in a predefined operating state for an indefinite period of time and changing at any time said predefined operating state.

3. A medium voltage switching device according to claim 2, wherein said first power supply device provides said electromagnetic actuation chain with the electric power, which is required for executing an operation of said electromagnetic actuator with a predefined operation frequency.

4. A medium voltage switching device according to claim 2, wherein said first power supply device provides said electromagnetic actuation chain with the electric power which is required for executing an operation of said electromagnetic actuator with a time delay shorter than a predefined period of time.

5. A medium voltage switching device according to claim 2, wherein said first circuit means comprise:
   a power drain unit which is connected to said medium voltage power distribution line; and
   a first power electronics unit, electrically connected to said power drain unit.

6. A medium voltage switching device according to claim 2, wherein said second circuit means comprise:
   said first power electronics unit; and
   an energy storage unit, electrically connected to said first power electronics unit, for storing an amount of electric energy.

7. A medium voltage switching device according to claim 2, wherein said second circuit means comprise a second power electronics unit which is electrically connected downstream said energy storage unit and is suitable for regulating the power supply from said energy storage unit to said electromagnetic actuation chain.

8. A medium voltage switching device according to claim 1, wherein said first power supply device provides said electromagnetic actuation chain with the electric power, which is required for executing an operation of said electromagnetic actuator with a predefined operation frequency.

9. A medium voltage switching device according to claim 8, wherein said first power supply device provides said electromagnetic actuation chain with the electric power which is required for executing an operation of said electromagnetic actuator with a time delay shorter than a predefined period of time.

10. A medium voltage switching device according to claim 8, wherein said first circuit means comprise:
   a power drain unit which is connected to said medium voltage power distribution line; and
   a first power electronics unit, electrically connected to said power drain unit.

11. A medium voltage switching device according to claim 8, wherein said second circuit means comprise:
   said first power electronics unit; and
   an energy storage unit, electrically connected to said first power electronics unit, for storing an amount of electric energy.

12. A medium voltage switching device according to claim 1, wherein said first power supply device provides said electromagnetic actuation chain with the electric power which is required for executing an operation of said electromagnetic actuator with a time delay shorter than a predefined period of time.

13. A medium voltage switching device according to claim 12, wherein said first circuit means comprise:
   a power drain unit which is connected to said medium voltage power distribution line; and
   a first power electronics unit, electrically connected to said power drain unit.

14. A medium voltage switching device according to claim 12, wherein said second circuit means comprise:
   said first power electronics unit; and
   an energy storage unit, electrically connected to said first power electronics unit, for storing an amount of electric energy.

15. A medium voltage switching device according to claim 1, wherein said first circuit means comprise:
   a power drain unit which is connected to said medium voltage power distribution line; and
   a first power electronics unit, electrically connected to said power drain unit.

16. A medium voltage switching device according to claim 15, wherein said second circuit means comprise:
   said first power electronics unit; and
   an energy storage unit, electrically connected to said first power electronics unit, for storing an amount of electric energy.

17. A medium voltage switching device according to claim 1, wherein said second circuit means comprise:
   said first power electronics unit; and
   an energy storage unit, electrically connected to said first power electronics unit, for storing an amount of electric energy.

18. A medium voltage switching device according to claim 1, wherein said second circuit means comprise a second power electronics unit which is electrically connected downstream said energy storage unit and is suitable for regulating the power supply from said energy storage unit to said electromagnetic actuation chain.

19. A medium voltage switching device according to claim 17, wherein said energy storage unit comprises at least a battery storage device and/or a capacitor storage device.

20. A medium voltage switching device according to claim 1, wherein said power supply means comprise a second power supply device which is electrically connected to a low voltage power distribution line.

* * * * *